United States Patent [19]

Bredow et al.

[11] Patent Number: 4,495,398

[45] Date of Patent: Jan. 22, 1985

[54] MACHINE FOR WORKING FLAT WORKPIECES BY CUTTING

[75] Inventors: Walter Bredow; Gerhard Otto, both of Alfeld, Fed. Rep. of Germany

[73] Assignee: C. Behrens AG, Alfeld, Fed. Rep. of Germany

[21] Appl. No.: 474,316

[22] Filed: Mar. 10, 1983

[30] Foreign Application Priority Data

Mar. 26, 1982 [DE] Fed. Rep. of Germany ....... 3211224

[51] Int. Cl.[3] .............................................. B23K 27/00

[52] U.S. Cl. ............................. 219/121 LG; 76/78 R; 83/282; 219/161; 269/237; 269/296

[58] Field of Search ................. 219/121 LG, 121 LN, 219/121 EH, 121 PC, 161, 158; 83/267, 282; 269/237, 296; 76/78 R, 78 A, 79

[56] References Cited

U.S. PATENT DOCUMENTS

| | | | |
|---|---|---|---|
| 654,829 | 7/1900 | Filstrup | 76/79 |
| 1,496,975 | 6/1924 | Bothwell | 76/79 |
| 2,293,231 | 8/1942 | Weiland | 76/79 X |
| 2,615,354 | 10/1952 | Higgins | 76/79 |
| 3,032,331 | 5/1962 | Doty et al. | 269/237 X |
| 4,317,021 | 2/1982 | Walch et al. | 219/121 LG |
| 4,434,684 | 3/1984 | Nixon | 76/79 X |

FOREIGN PATENT DOCUMENTS 2940730 4/1981 Fed. Rep. of Germany ..... 76/78 R

*Primary Examiner*—C. L. Albritton
*Attorney, Agent, or Firm*—Michael J. Striker

[57] ABSTRACT

A machine for working workpieces with a round outer contour by cutting has a coordinate table arranged to displace a workpiece in x-direction and y-direction and having a clamping guide extending in x-direction, a cutting device acting substantially in z-direction, and moving in a predetermined movement region, and clamping arrangement arranged to releasably hold the workpiece on the coordinate table and including a central clamping device arranged on the clamping guide, aligned with the axis of symmetry extending through the center axis of the workpiece, and having clamping elements mounted displaceable in the direction of the axis of symmetry, also including two lateral clamping devices displaceably arranged on the clamping guide, located at opposite sides of the central clamping device, and each having clamping elements which are mounted pivotally about at least one pivot axis extending substantially normal to the workpiece plane and parallel to the z-axis so that the clamping elements can move from a releasing position in which the workpiece and the movement region of the cutting means are released to a clamping position in which they engage the workpiece and vice versa.

12 Claims, 8 Drawing Figures

L
5
30
S
1
4
6
L1
L2
12
L4
31
16
32
13
13'
12
11
14
21
9
47
22
L3
15
20
10
3
2
8
7
2'
10
Y
X
X
Y

1
S
4
6
L4
L3
L1
L
L2
5
16
12
32
13
11
14
13'
21
9
47
22
15
10
3
2
8
7
2'
10
Y
X
X
Y

15'
3
8
7
52
7b
7a
51
42
53
54
40
45
50
41
37
39
43
38
44
49
48
5
X
X 47
14
32
14a
12
15
3
10
10a
20
21
16
33
46
57
34
56
55
5
36
35

MACHINE FOR WORKING FLAT WORKPIECES BY CUTTING

BACKGROUND OF THE INVENTION

The present invention relates to a machine for working flat workpieces with a round, particularly circular outer contour by cutting.

Machines of the above-mentioned general type are known in the art. In a known machine a controlled coordinate table displaces a workpiece in x- and y-directions, a cutting device such as a lazer cutting device acts in a z-direction and a clamping device releasably holds the workpiece on the coordinate table.

In these machines, for example in revolving cutting presses with coordinate tables NC or CNC controlled as a rule or in machines with lazer cutting devices and the coordinate tables, as well as in the revolving cutting presses combined with a lazer cutting device and provided with the coordinate tables, a flat particularly sheet-shaped initial material is generally rectangular. Abutments and clamping elements of conventional coordinate tables are designed for such rectangular workpieces and cuts. In practice, in special application cases, it is required to clamp flat workpieces with a round, particularly circular outer contour and to further work them in the machine. For example, this is generally the case during manufacture of circular saw blades. During manufacture of circular saw blades the hardened round blanks are assembled in a packette and teeth are produced by grinding on special grinding machines. It has been shown that the teeth can be effectively produced by lazer cutting. The manufacture of such circular saw blades by lazer technique is possible on lazer cutting devices or machines of respective type. However, there are considerable difficulties in clamping the round blanks on the coordinate table. For maximum utilization of initial material, the round blanks are cut only with a small surplus relative to the finished saw blade, so that the remaining edge is not sufficient as a clamping strip. This means that after working, the saw blade must be rotated after production of substantially a half of the teeth. This arrangement and process are, on one hand, very time-consuming and, on the other hand, there is a danger that during rotation of the round blank the center will be lost and no perfect exact concentric running of the toothing will be obtained.

SUMMARY OF THE INVENTION

Accordingly, it is an object of the present invention to provide a machine which avoids the disadvantages of the prior art.

More particularly it is an object of the present invention to provide a machine with such a clamping device which makes possible to avoid the above-described difficulties in clamping of a workpiece and to provide clamping which is suitable for exact working of round and particularly circular flat workpieces on a coordinate table.

It is also an object of the present invention to provide the clamping device which is simple and suitable for working, and on the one hand makes possible fast equipping of the machine with the required clamping device and on the other hand guarantees execution of the respective clamping steps in the control course of the machine.

In keeping with these objects and with other which will become apparent hereinafter, one feature of the present invention resides, briefly stated, in a machine which has a coordinate table arranged to displace a workpiece in x-direction and y-direction and having a clamping guide extending in x-direction, cutting means acting substantially in z-directions and moving in a predetermined movement region, and clamping means arranged to releasably hold the workpiece on the coordinate table, the clamping means including a central clamping device arranged on the clamping guide, aligned with the axis of symmetry extending through the center axis of the workpiece, and having clamping elements mounted displaceable in the direction of the axis of symmetry, the clamping means also including two lateral clamping devices displaceably arranged on the clamping guide, located at opposite sides of the central clamping device and each having clamping elements which are mounted pivotally about at least one pivot axis extending substantially normal to the workpiece plane and parallel to the z-axis so that the clamping elements can move from a releasing position in which the workpiece and the movement region of the cutting means are released to a clamping position in which they engage the workpiece and vice versa.

When the machine is designed in accordance with the present invention, a main clamping step can be carried out in the axis of symmetry of the workpiece by the central clamping device. The displaceable and pivotable lateral clamping devices can clamp at both sides a round and particularly circular workpiece, that is a round blank in accordance with the workpiece diameter and its contour. During the cutting work and displacement of the workpiece including the clamping devices over the coordinate table through the working region of the cutting device, a selected lateral clamping device is released from the workpiece and turned out of the respective movement region, so as to release the respective region of the workpiece circumference for the cutting work. Both remaining clamping devices reliably hold the workpiece during the positioning movement of the coordinate table. Thus with the optimal orientation of the workpiece, an exact working is possible over the entire circumference, without changing the initial clamping position of the workpiece. Thereby the time for the working is reduced to a minimum and the danger of losing exact positioning and particularly the center of the workpiece during the working is completely eliminated. The invention can be used for all machines of this type which carry out cutting works with their cutting devices and in which the workpiece is positioned with the aid of a coordinate table. Since the adjustment movement of the workpiece proper is dispensed with, it is possible with exact maintaining of the initial clamping position to control each clamping step with the aid of the available control devices.

An especially exact adjustment of the lateral clamping devices to the contour of the workpiece and particularly for workpieces with considerably different diameters is possible when the lateral clamping devices have supports and clamping heads which carry the clamping elements, each of the clamping heads are supported on a respective one of the supports pivotally about a first pivot axis fixably, each of said supports are supported on the part pivotally about a second pivot axis. The lateral clamping devices are first displaced on the clamping guide to the favorable position. After this, in correspondence with the outer contour of the workpiece, the clamping head is transferred by pivoting about its first pivot axis and subsequent arresting to the favorable position. The pivoting in and out of the clamping heads during the working process takes place with the aid of a suitable device provided on the clamping device, by turning the support about the second pivot axis. This provides for high adaptability of the lateral clamping devices and thereby the entire machine to the respective workpiece with different outer contours and particularly diameters.

An especially favorable and simply controllable lateral clamping device are provided when the clamping elements of each of the lateral clamping devices are formed as a supporting member held on the clamping head, and a pliers-like clamping lever cooperates with the supporting member and is pivotally supported on the latter. The workpiece rests on the supporting member and clamped in pliers-like manner by the clamping lever via a drive provided on the clamping head.

The supporting member has a clamping point and is supported pivotally and adjustably about an axis which is parallel to the workpiece plane, so as to adjust a height of the clamping point. This makes possible a simple adaptation of the support to the respective height of the lower side of the workpiece to be worked.

For providing a simple construction of the central clamping device and its clamping action it is advantageous to form the central clamping device so that a part is mounted on the clamping guide, the central clamping device has a slider displaceable on the part along the axis of symmetry, the clamping elements of the lateral clamping devices are formed as clamping jaws arranged on the slider. By the slider with its clamping jaws, the clamping process can be carried out and controlled by simple structural part exactly and fast.

One of the clamping jaws is formed on the slider as a workpiece support, the other of the clamping jaws being formed as a clamping lever which are pivotable on the slider about an axis extending parallel to a workpiece plane and in x-direction. This construction is advantageous for the clamping action and a simple drive with a simple control.

The machine comprises locking means arranged on the slider to arrest the clamping lever in its pivot position releasing the workpiece and releasable by an abutment on the part because of displacement of the slider. This construction provides for especially advantageous function of the clamping lever in connection with the slider.

For exactly centering of the workpiece prior to its clamping and associating this centering with the clamping devices and particularly the central clamping device, the machine comprises a centering member arranged on the clamping guide and extends along the axis of symmetry, the centering member being held releasably and having a slot extending along the axis of symmetry, and a centering pin received in the centering member and guided in the center of the workpiece.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

The inventive machine is based on a machine of the above-described type in which the coordinates "x", "y" and "z" are provided in accordance with the German Standard DIN 66 217. As an example, a machine for working flat workpieces with circular outer contour is shown. Only those parts of the machine and its coordinate table which are needed for understanding of the present invention are shown. A laser device is illustrated as a cutting device of the machine. The machine serves in particular for manufacturing of circular saw blades.

Figure 1:
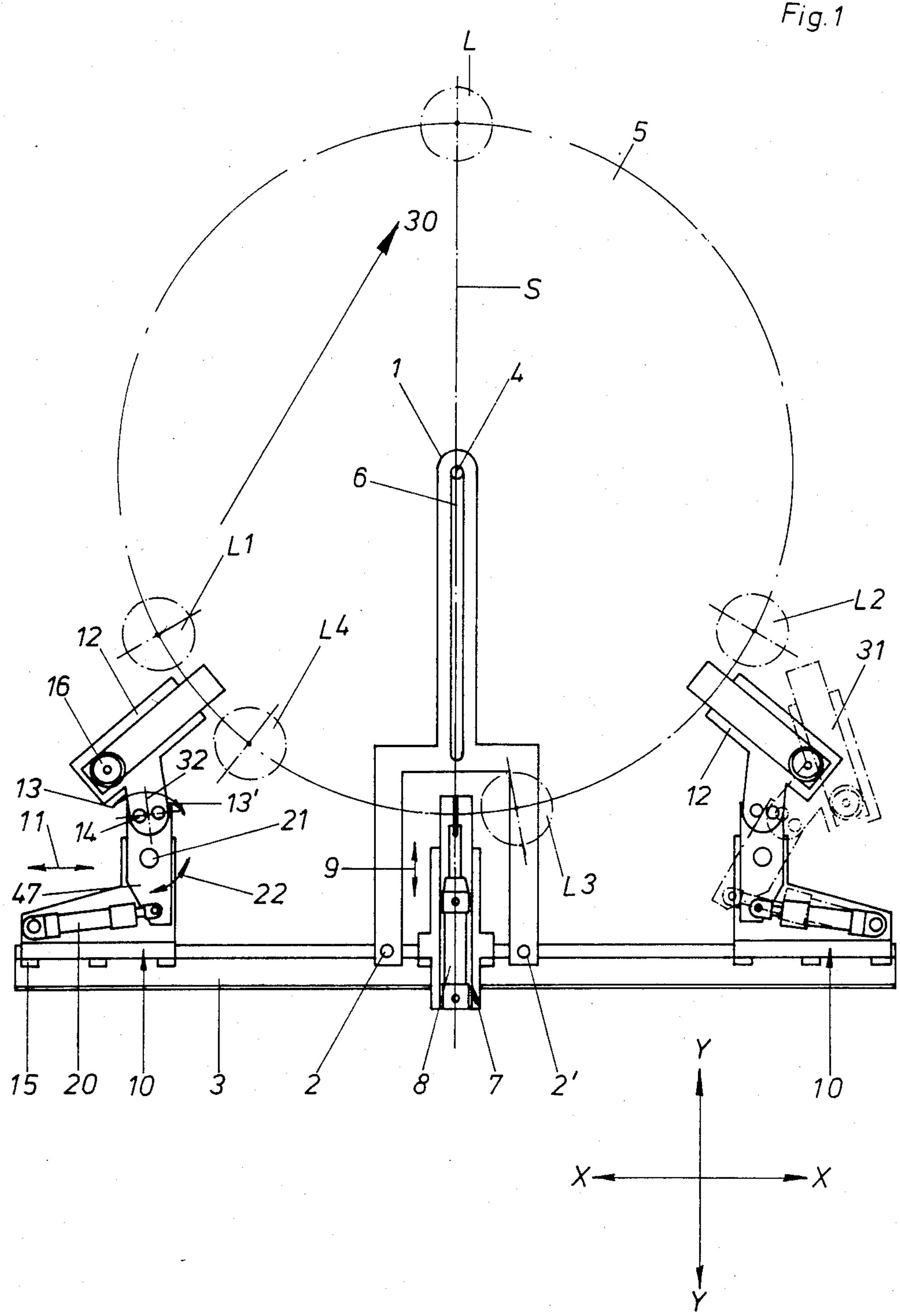
FIG. 1 is a plan view of a machine for working workpieces by cutting with a round blank of a maximum diameter, in accordance with the present invention.
Figure 2:
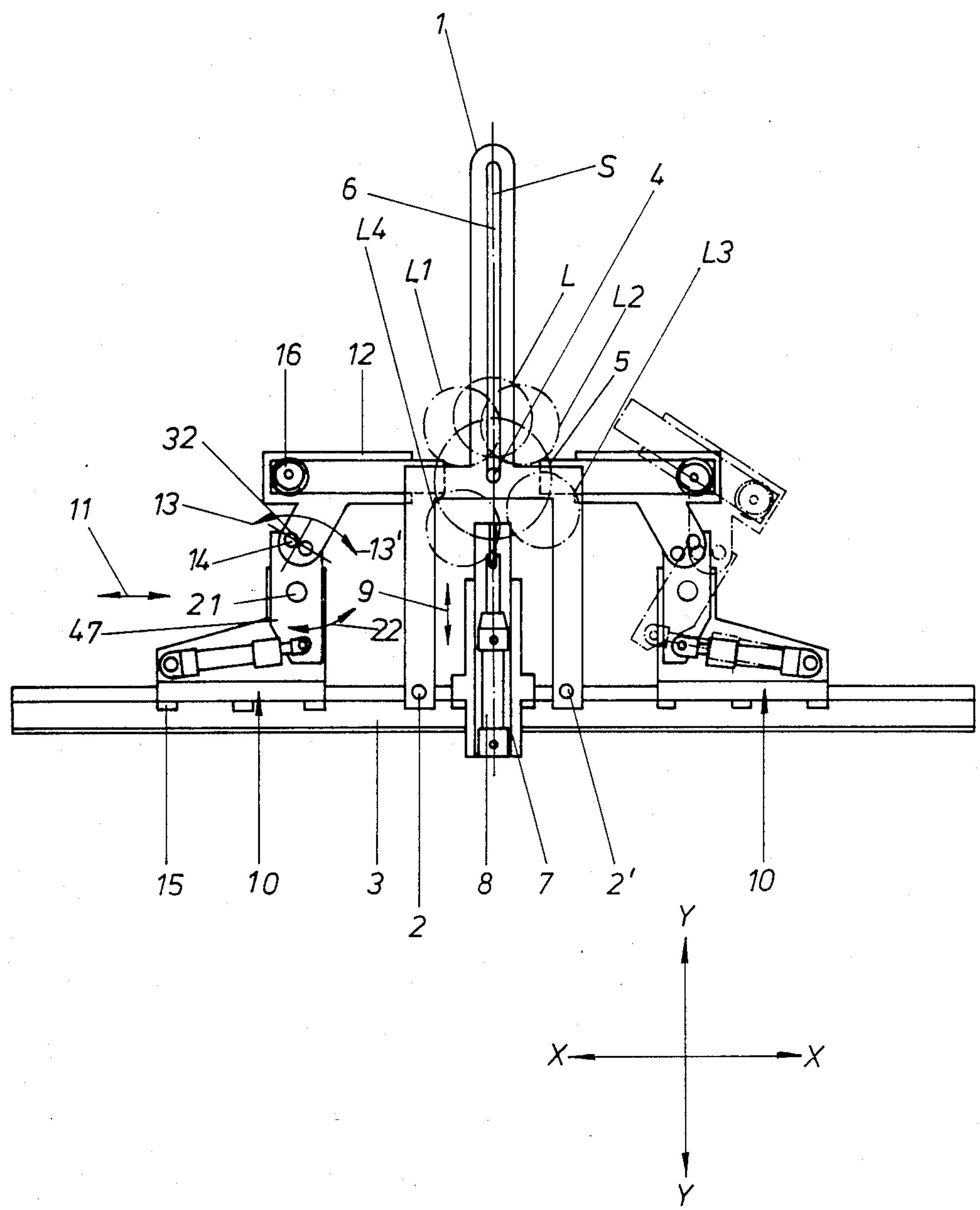
FIG. 2 is a plan view corresponding to the view of FIG. 1 but showing clamping of a round blank with a minimum diameter.

FIGS. 1 and 2 illustrate the basic construction of the machine in accordance with the present invention. A centering member 1 which extends along an axis of symmetry S of a round blank 5 to be clamped is releasably held on a clamping guide 3 of a not shown coordinate table of the machine. The clamping guide 3 extends in the x-direction. The above-mentioned releasable connection can be performed, for example, with the aid of pins 2 and 2'. A pin 4 extends through the center of the round blank 5, namely through a center hole provided in the latter. Thereby the round blank 5 is fixed centrally relative to the coordinate table and thereby also to a laser cutting device L. The pin 4 is inserted for centering in a slot 6 of the centering member 1, which extends along the axis of symmetry S. A comparison of FIGS. 1 and 2 makes clear that the slot 6 of the centering member 1 makes possible the utilization of the same centering member both for a maximum diameter of the round blank shown in FIG. 1 and a minimum diameter of the round blank shown in FIG. 2.

A central clamping device is releasably mounted on the clamping guide 3 of the coordinate table and directed to the axis of symmetry S extending through the center of the round blank 5. The clamping device has clamping elements which are displaceable along the axis of symmetry. The central clamping device is identified as a whole with reference numeral 7. As described hereinbelow, the clamping elements of the central clamping device 7 are displaceable in the direction of arrow 9 along the axis of symmetry S with the aid of a drive, here a pressure air cylinder-and-piston unit 8. At both sides of the central clamping device 7 two lateral clamping devices are displaceably arranged on the clamping guide 3 and are mirror-symmetrical relative to the axis of symmetry S and therefore relative to the central clamping device 7. The lateral clamping devices, disregarding their mirror-symmetrical arrangement, are formed identically and identified as a whole with reference numeral 10. The lateral clamping devices 10 can be displaced by hand in direction of the arrows 11 on the clamping guide 3, in order to match the diameter of the round blank 5, as can be seen from a comparison of FIGS. 1 and 2. As will be explained hereinbelow, the clamping elements of the lateral clamping devices 10 are provided on a clamping head 12 and pivotable about a pivot axis 21 on the respective lateral clamping device 10 about a pivot axis 21 extending normal to the plane of the round blank 5 or parallel to the z-axis. These clamping elements are pivotable from a releasing position 31 shown in broken lines in the right clamping device 10, to a clamping position shown in solid lines, and vice versa. This pivotal movements are identified with the arrow 22. A pressure air cylinder-and-piston unit 20 is provided for carrying out these pivoting movements in the shown embodiment. The cylinder-and-piston unit 20 engages a support 47 which is supported on the pivot axis 21 and carries at its other end the clamping head 12.

For carrying out the matching of the lateral clamping devices 10 to the diameter of the round blank in optimum manner, namely to provide a fine adjustment of the clamping position, the clamping head 12 is in turn supported on the support 47 pivotally about a second pivot axis and is fixable in the respective pivoting position with the aid ofscrews 14. The possible pivoting movement of the clamping head 12 is identified with arrows 13 or 13'. For releasable mounting of the clamping devices 10 on the clamping guide 3, clamps 15 are for example utilized.

Figures 3, 3A:
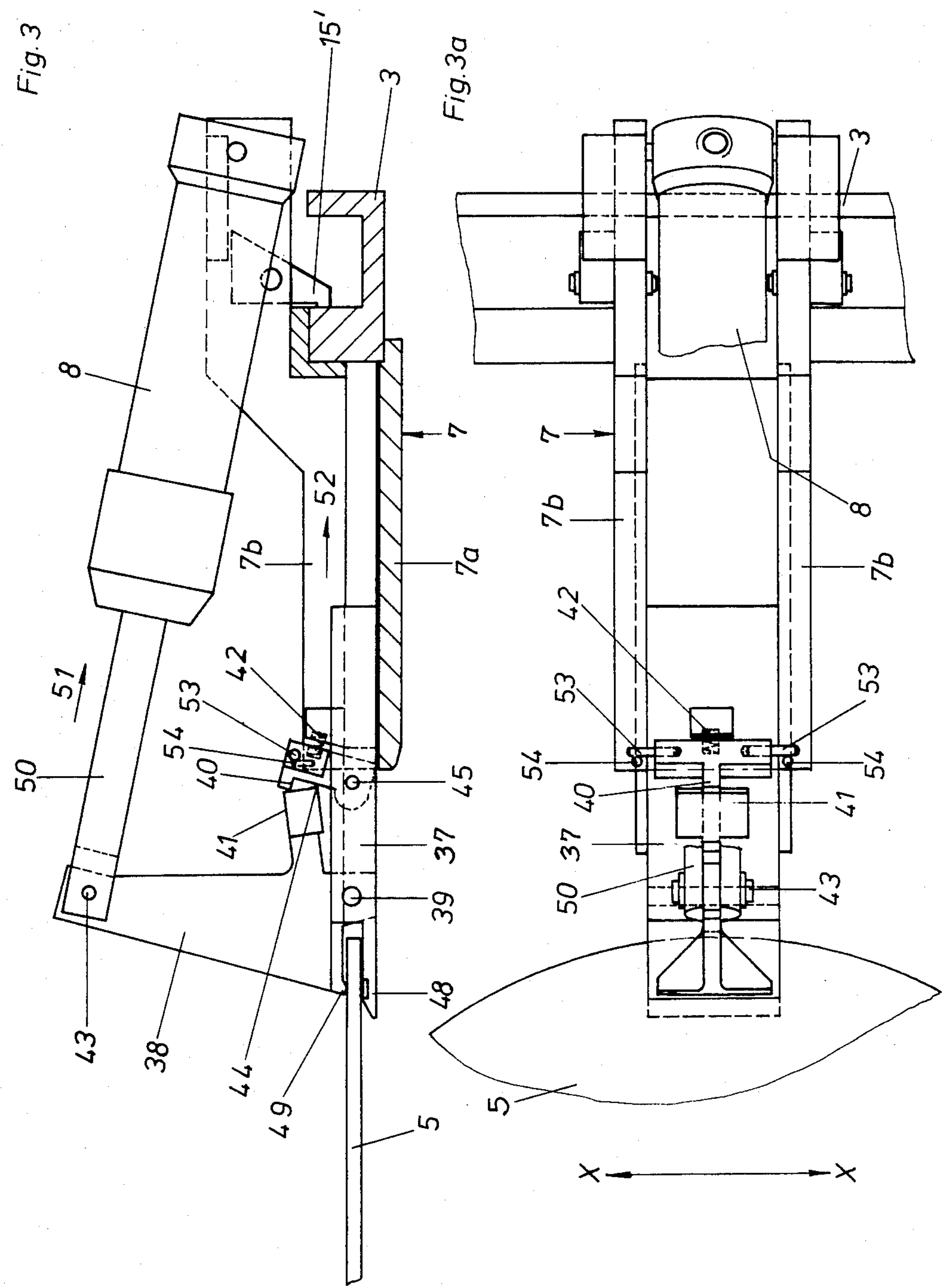
FIG. 3 is a side view showing a central clamping device of the inventive machine.
FIG. 3*a* is a plan view of the clamping device of FIG. 3 with a partially broken drive for a clamping lever.

An example of a further construction of the central clamping device is shown in FIGS. 3 and 3*a*. A base plate 7*a* with lateral walls 7*b* of the clamping device 7 is releasably connected with clamping claws 15' on the clamping guide 3. The clamping elements of the central clamping device 7 are arranged on a slider 37 which is displaceable in the direction of the axis of symmetry S on the base plate 7*a*, namely guided in the lateral walls 7*b*. The clamping elements are formed as clamping jaws acting as pliers. Namely they include a clamping jaw 48 formed on the front end of the slider 37 and a clamping jaw 49 formed on a clamping lever 38. The clamping lever 38 is supported on the slider 37 pivotally about an axis 39 and is driven for its pivoting movement from the pressure air cylinder-and-piston unit 8 via a piston rod 50 and a pivot member 43. At its rear side, the clamping lever 38 has a projection 41 cooperating with a locking device. The locking device includes a catch 40 supported in the slider 37 by a member 45 and arranged in direction to the clamping lever 38 under the action of a spring 42. Laterally, the catch has abutment pins 53 which cooperate with abutment pins 54 mounted on the lateral walls 7*b* of the base plate 7*a*.

The round blank 5 is clamped with the aid of the pressure air cylinder-and-piston unit 8 which transmits its force via a pin 43 to the clamping lever 38. By pivoting the clamping lever 38 about an axis 39 formed as a pin, the pliers formed between the clamping jaws 48 and 49 closes and clamps firmly the round blank 5. When the round blank 5 must be released, the air is controlled in the pressure air cylinder-and-piston unit 8 in opposite direction, so that the clamping lever 38 moves in opposite direction, namely in the direction to the clamping guide 3, until an edge 44 of the projection 41 abuts against the slider 37. Since at this time the piston of the cylinder-and-piston unit 8 has not reached its end position, during further movement of the piston rod 50 in the direction of the arrow 51 (releasing movement) the slider 37 is further moved back in direction of the arrow 52 until the pliers formed by the clamping jaws 48 and 49 completely release the round blank 5. During this displacement movement in the direction of the arrow 52, the catch 40 lies under the influence of the spring 49 against the projection 41 of the clamping lever 38. Thereby locking of the clamping lever 38 in the releasing position is provided. Because of this, in the event of renewed clamping of the round blank 5, the slider 37 with the clamping lever 38 is displaced in its open position (releasing position) by the piston rod 50 in direction to the blank 5 and until the abutment pins 53 of the catch 40 abut against the abutment pins 54 of the base plate 7*a*. During further displacement of the slider 37 in direction to the round blank 5, the projection 41 slides under the catch 40 so that the clamping lever 38 again pivots about the axis 39 and the pliers of the clamping jaws 48 and 49 closes and clamps the round blank 5.

Figures 4, 4A, 4B:
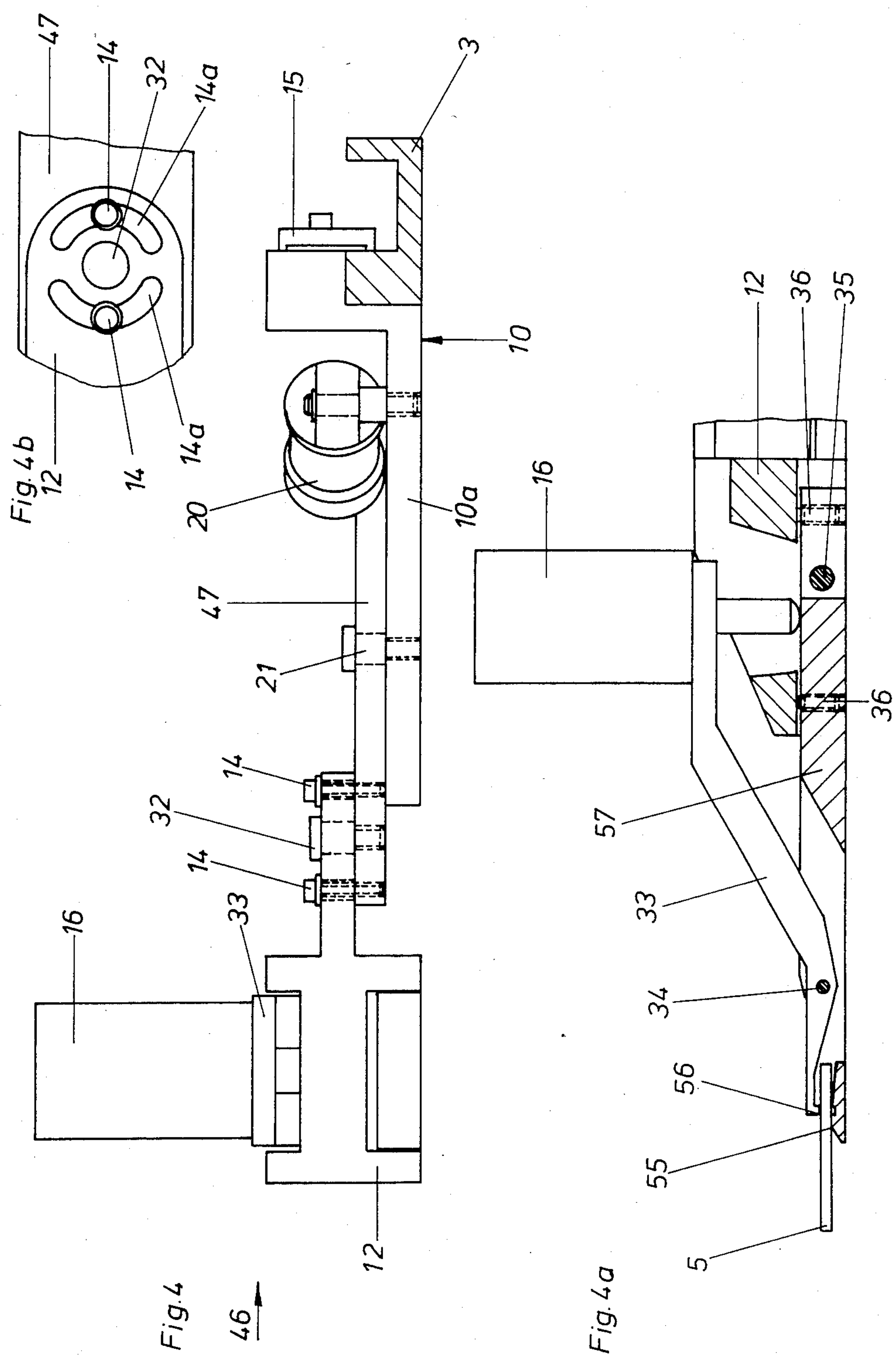
FIG. 4 is a view direction of the arrow 11 in FIG. 2 of the lateral clamping devices.
FIG. 4*a* is partially sectioned view of a clamping head of the lateral clamping device of FIG. 4 as seen in the direction of the arrow 46.
FIG. 4*b* is a partial plan view of the clamping device of FIG. 4 showing pivotable and fixable connections between the clamping head and its support.

FIGS. 4, 4*a* and 4*b* show an example of the construction of the lateral clamping device 10. It is again to be remembered that both lateral clamping devices 10 have the same construction, but are mirror-symmetrical relative to the axis of symmetry S of the machine, and thereby to the central clamping device 7. The clamping device 10, which is located at the left side in FIGS. 1 and 2, is described hereinbelow. A base plate 10*a* of the clamping device is mounted releasably, particularly displaceably, with the aid of the clamp 15 on the clamping guide 3. A supporting plate 47 is supported on the base plate 10*a* pivotally about the axis 21 which extends normal to the workpiece plane. A pressure air cylinder-and-piston unit 20 serves for pivot drive of the support plate 47 and is supported on the base plate 10*a* as well. The supporting plate 47 carries at its free end facing away from the clamping guide 3 a clamping head which is pivotable via a pivot axis 32 extending normal to the workpiece plane and identified with reference numeral 12. The clamping head 12 can be adjusted by hands about the pivot axis 32 in its angular position relative to the round blank 5 or to the supporting plate 47. It can be fixed in its angular position as shown in for example in FIG. 4*b*, namely with the aid of the screws 14 which extend through circular elongated holes 14*a* of the clamping head 12 and screwed in the supporting plate 47, as can be seen from FIG. 4.

The clamping elements of each clamping device 10 are also formed as pliers. They include, on the one hand, a supporting piece 57 supported on the clamping head 12 and having a front clamping point 55, and on the other hand a clamping lever 33 which is supported on the supporting piece 57 pivotably about the axis 34 and has a front clamping point 56. At its rear free end it is driven to clamping and releasing positions by the pressure air cylinder-and-piston unit 16. The supporting piece 57 is also supported on the clamping head 12 pivotally about the axis 35 extending parallel to the workpiece plane. It can be adjusted in a vertical direction with the aid of an adjusting screw 36 on the clamping head 12 so as to change the height of the clamping point 55.

With the aid of the lateral clamping devices 10, the round blank 5 is clamped in the following manner. The round blank is clamped by the respective actuation of the pressure air cylinder-and-piston unit 16 and thereby the clamping lever 33 between the clamping points 55 and 56, since the clamping lever 33 in the event of respective actuation of the cylinder-and-piston unit 16 pivots about the axis 34 and applies respective clamping force onto the round blank 5 and the clamping point 55 with the aid of the clamping point 56. If during working of the clamped round blank the lateral clamping device 10 hinders the working process, the pressure air cylinder-and-piston unit 16 is first made pressureless, so that the round blank 5 is released at the clamping points 55 and 56. After this, by respective actuation of the pressure air cylinder-and-piston unit 20, the supporting plate 47 is turned about its axis 21 in direction of the arrow 13 in FIGS. 1 and 2 and thereby the clamping head 12 is turned outwardly beyond the region of the round blank edge, as in the position 31 in FIG. 1 in the right clamping device 10.

Figure 5:
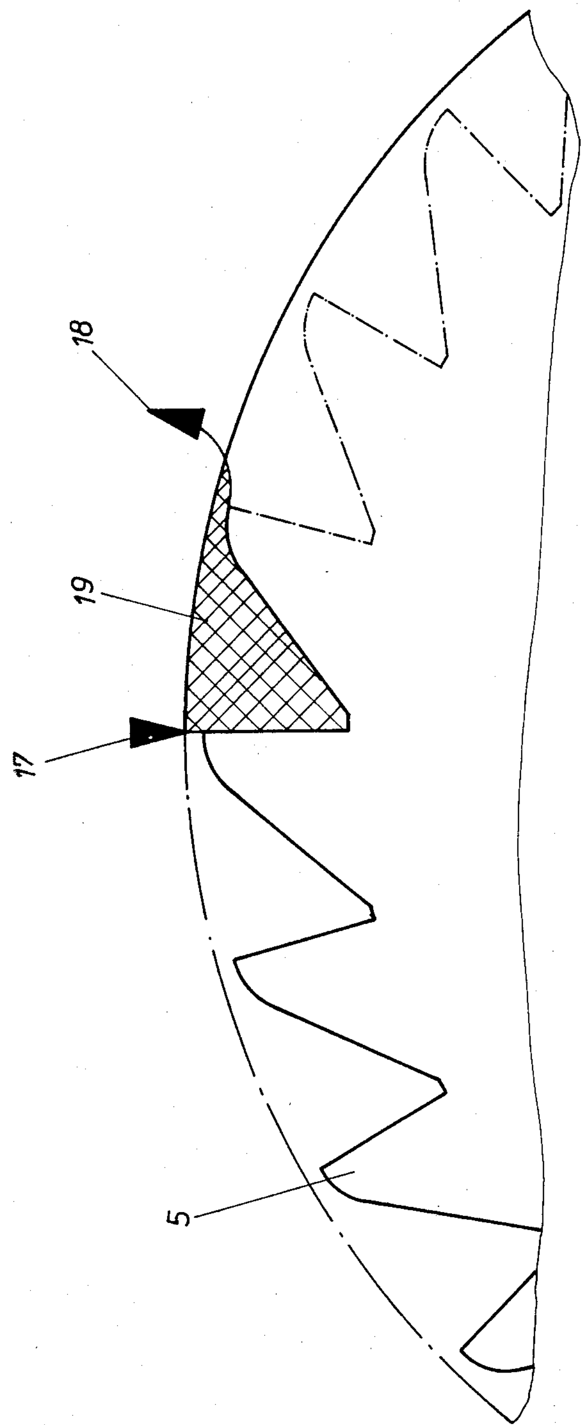
FIG. 5 is a view illustrating a cutting process by a lazer beam as can take place during manufacture of a circular saw blade from a round blank.

When in the above described manner the adjusting works at the central clamping device 7 and both lateral clamping devices 10 are completed and thereby the first round blank 5 is clamped, the centering member 1 is first removed from the clamping guide 3. The coordinate table is positioned with this clamping so under the not shown laser cutting device L (in direction of arrow 30 in FIG. 1) until the working position L1 coincides with the position identified by L. In this working position L1, cutting of the round blank 5 starts as shown in FIG. 5. When the laser beam enters the material of the round blank 5 in the point 17 and leaves the same in the point 18, a waste part 19 is separated and removed. As an example it is shown in FIG. 5 that this waste part 19 embraces only one tooth gap. In dependence upon the respective purpose, it can cover several tooth gaps, which are cut one after the other and the waste material is removed as a whole. This cutting step repeats uninterruptedly, until by the movement of the coordinate table the working point L2 is reached. At this point, the positioning of the coordinate table is interrupted. With the aid of a respective auxiliary function provided in the machine, the right lateral clamping device 10 in FIG. 1 releases the described clamping of the round blank 5 via the pressure air cylinder-and-piston unit 16, and by actuation of the pressure air cylinder-and-piston unit 20 turns the supporting plate 47 with the clamping head 12 about the axis 21 in direction of the arrow 22 while maintaining the adjustment of the clamping head 12, into the releasing position 31 shown in FIG. 1. At this time the round blank 5 is retained only by the central clamping device 7 and the left lateral clamping device 10 in FIG. 1. Furthermore, the round blank 5 is always supported at the working point L from below by several not shown supporting faces. After turning off of the clamping head 12 of the right lateral clamping device 10 in FIG. 1, the laser cutting device L is again turned on, and the coordinate table runs further along the described and controlled paths at the periphery of the round blank 5 to the working location L3. Here a programmed stop take place. The right clamping head 12 in FIG. 2 is pivoted to its orginal clamping position shown in continous lines, and the pressure air cylinder-and-piston unit 16 is again actuated so that the round blank 5 is again held by both clamping heads 12 or by both lateral clamping devices 10. When this happens, the slider 37 with the clamping elements of the central clamping device 7 is pulled back and the laser cutting operation is again carried out until the working location L4 is reached. When the laser cutting device L and the coordinate table are again stopped, the slider 37 of the central clamping device 7 is pushed forward, and the round blank 5 at this point is again clamped with the aid of the above described clamping elements. The pressure air cylinder-and-piston unit 16 at the left lateral clamping device 10 in FIG. 1 is relaxed and the left clamping head 12, as described above with respect to the right clamping device 10, pivots back to its releasing position, so that the last piece of the periphery of the round blank 5 can be finally cut between the working locations L4 and L1.

With the same chucking, the central hole of the workpiece can obtain its predetermined form by the laser cutting or by suitable tool arranged on the machine. Also other cutouts for mounting or other purposes can be cut with the aid of laser cutting device in the workpiece, for example eventually predetermined expansion grooves. If such works are to be done, the machine is advantageously formed as a revolver cutting press with laser cutting device. After the coordinate table runs back to its initial loading position, the finished workpiece, for example, a circular sawblade, can be removed.

It will be understood that each of the elements described above, or two or more together, may also find a useful application in other types of constructions differing from the types described above.

While the invention has been illustrated and described as embodied in a machine for working flat workpieces by cutting, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A machine for working workpieces with a round outer contour by cutting, comprising a coordinate table arranged to displace a workpiece in x-direction and y-direction and having a clamping guide extending in x-direction; cutting means acting substantially in z-directions and moving in a predetermined movement region; and clamping means arranged to releasably hold the workpiece on said coordinate table, said clamping means including a central clamping device arranged on said clamping guide, aligned with the axis of symmetry extending through the center axis of the workpiece, and having clamping elements mounted displaceable in the direction of the axis of symmetry, said clamping means also including two lateral clamping devices displaceably arranged on said clamping guide, located at opposite sides of said central clamping device and each having clamping elements which are mounted pivotally about at least one pivot axis extending substantially normal to the workpiece plane and parallel to the z-axis so that said clamping elements can move from a releasing position in which the workpiece and the movement region of said cutting means are released to a clamping position in which they engage the workpiece and vice versa.

2. A machine as defined in claim 1, wherein said cutting means includes a laser cutting device.

3. A machine as defined in claim 1; and further comprising a part arranged on said clamping guide, said lateral clamping devices having supports and clamping heads which carry said clamping elements, each of said clamping heads being supported on a respective one of said supports pivotally about a first pivot axis and fixably, each of said supports being supported on said part pivotally about a second pivot axis.

4. A machine as defined in claim 3; and further comprising drive means arranged to pivot each of said supports about said second axis.

5. A machine as defined in claim 3, wherein said clamping elements at each of said lateral clamping devices is formed as a supporting member held on said clamping head, and a pliers-like clamping lever cooperating with said supporting member and pivotally supported on the latter.

6. A machine as defined in claim 5; and further comprising drive means arranged to pivot said clamping lever of each of said lateral clamping devices.

7. A machine as defined in claim 5, wherein said supporting member has a clamping point and is supported pivotally and adjustably about an axis which is parallel to the workpiece plane, so as to adjust a height of said clamping point.

8. A machine as defined in claim 1; and further comprising a part mounted on said clamping guide, said central clamping device having a slider displaceable on said part along the axis of symmetry, said clamping elements of said central clamping device being formed as clamping jaws arranged on said slider.

9. A machine as defined in claim 8, wherein one of said clamping jaws is formed on said slider as a workpiece support, the other of said clamping jaws being formed as a clamping lever which is pivotable on said slider about an axis extending parallel to the workpiece plane and in x-direction.

10. A machine as defined in claim 9; and further comprising drive means for pivoting said clamping lever about said axis.

11. A machine as defined in claim 10; and further comprising locking means arranged on said slider to arrest said clamping lever in its pivot position releasing the workpiece and releasable by an abutment on said part because of displacement of said slider.

12. A machine as defined in claim 1; and further comprising a centering member arranged on said clamping guide and extending along said axis of symmetry, said centering member being held releasably and having a slot extending along the axis of symmetry, and a centering pin received in said centering member and guided in a center of the workpiece.

* * * * *